Oct. 1, 1968    H. GOLDBERG    3,404,235
METHOD AND APPARATUS FOR THE TESTING OF HEARING
Filed Jan. 18, 1966    3 Sheets-Sheet 1

INVENTOR
HYMAN GOLDBERG
BY
ATTORNEY

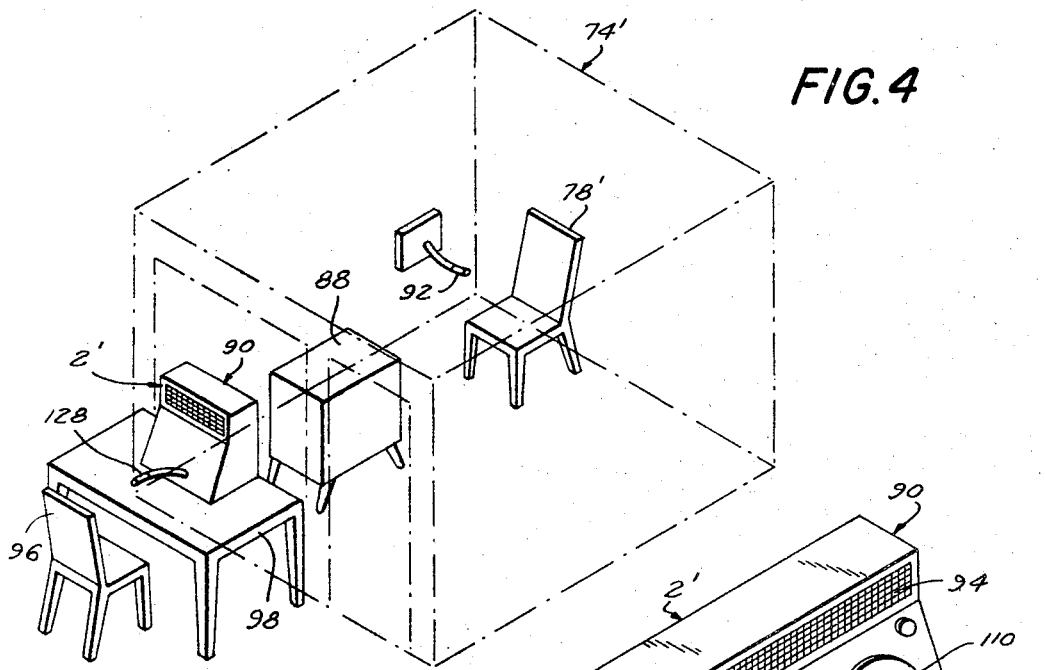
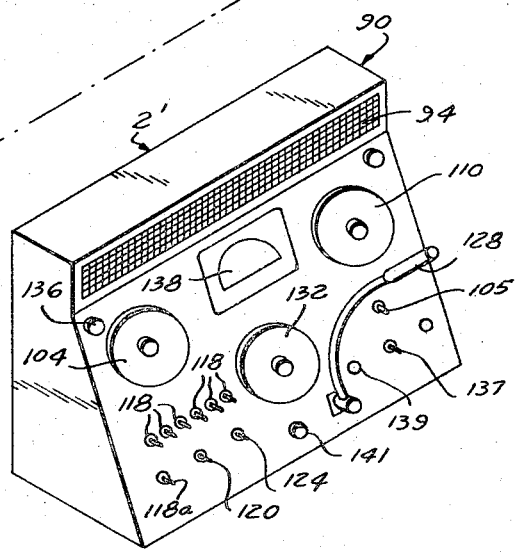
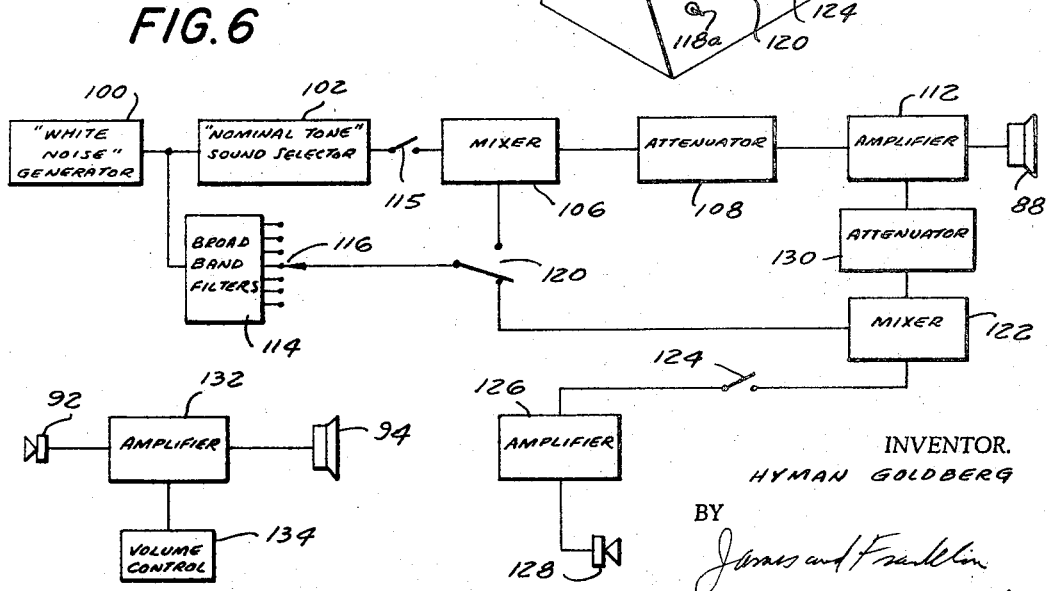

Oct. 1, 1968 H. GOLDBERG 3,404,235
METHOD AND APPARATUS FOR THE TESTING OF HEARING
Filed Jan. 18, 1966 3 Sheets-Sheet 3
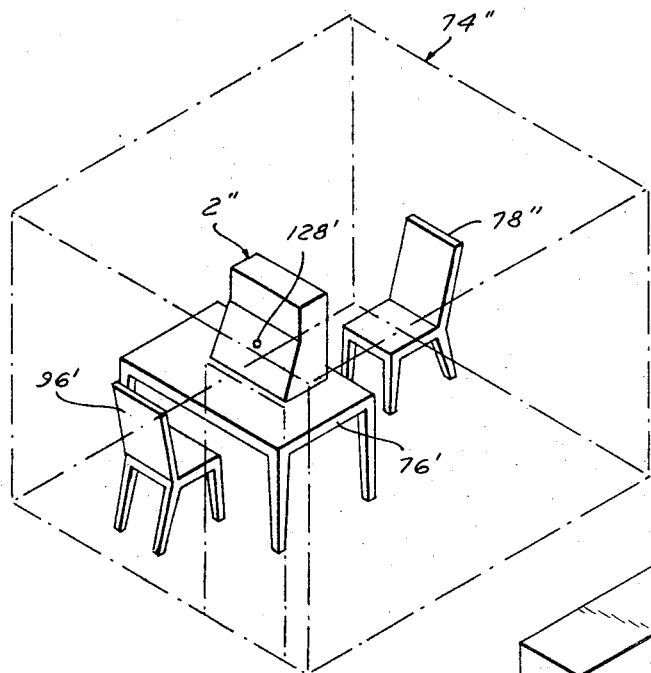
FIG.7
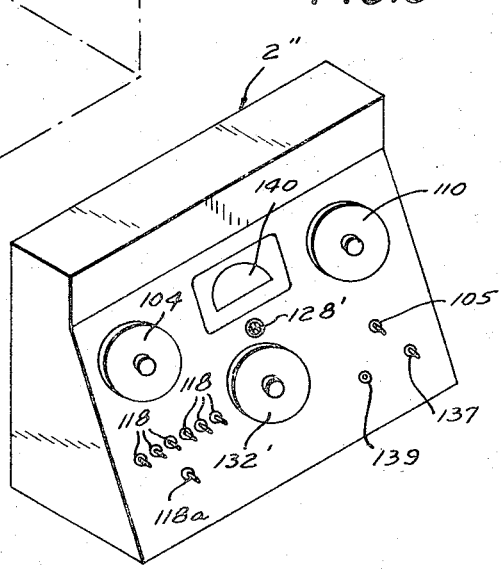
FIG.8
FIG.9
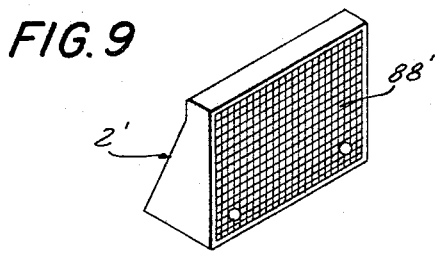
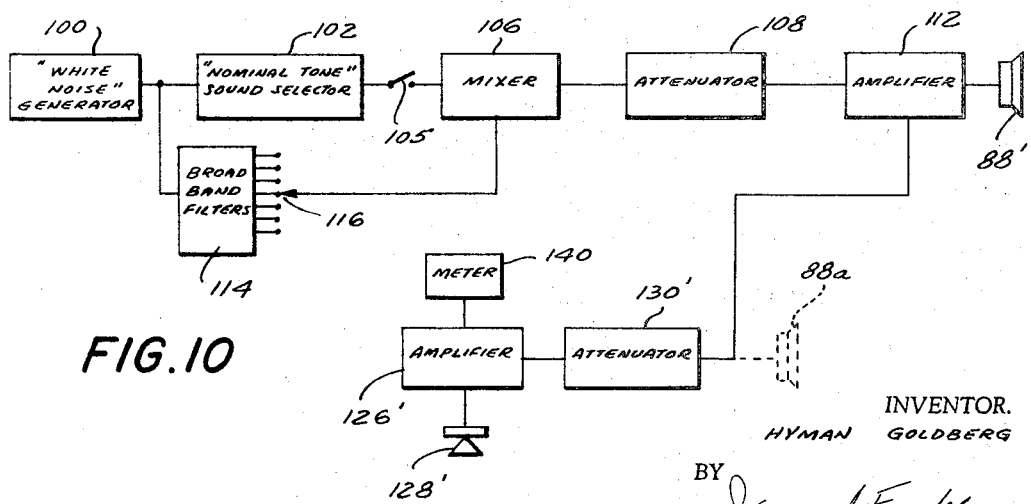
FIG.10
INVENTOR.
HYMAN GOLDBERG
BY James and Franklin
ATTORNEY

United States Patent Office 3,404,235
Patented Oct. 1, 1968

3,404,235
METHOD AND APPARATUS FOR THE TESTING OF HEARING
Hyman Goldberg, 2904 Ewing Ave. S.,
Minneapolis, Minn. 55416
Continuation-in-part of application Ser. No. 420,323,
Dec. 22, 1964. This application Jan. 18, 1966, Ser.
No. 525,816
8 Claims. (Cl. 179—1)

ABSTRACT OF THE DISCLOSURE

The hearing of an individual is tested at different sound frequencies by providing, for each nominal frequency, a composite sound containing sounds of random frequencies extending over a substantial spectrum of the normal audible frequency range, thereby substantially eliminating the deleterious effects of standing waves on the accuracy and effectiveness of the hearing test. Background noise, either in the nature of speech or a composite sound comprising sounds of random frequency defining a broad band sound, or both, may also be provided in order to make the testing more accurately correspond to normal everyday conditions.

---

The present invention relates to method and apparatus for testing the hearing of individuals and for allied purposes.

This application is a continuation in part of my prior application Ser. No. 420,323, now abandoned, filed Dec. 22, 1964, and having the same title as this application.

Accurate determination of the hearing ability of a particular individual has in the past been a rather laborious and time-consuming proceeding which at best was effective only to ascertain the unaided hearing capability of the individual and which was most inaccurate when used to determine the hearing capabilities of the individual while he was using a hearing aid. As a result meaningful determination of the hearing acuity of a particular individual who was to be fitted with a hearing aid has been carried out only in a small proportion of the applicable cases, and no practical means has been readily available for determining the actual amount of hearing improvement which is produced by a hearing aid, nor of demonstrating said improvement to the individual involved.

The conventional method used for determining the acuity of hearing of a particular individual is to produce, within a room or other enclosed space, a tone having substantially a single frequency within the audible frequency range and then adjusting the amplitude or intensity of that pure tone until the patient can just barely hear it, thereby determining the lower threshold of hearing of the individual for that particular sound frequency. If desired, the volume of the pure tone can then be increased until it becomes so loud as to be painful to the patient, thereby determining the individual's pain threshold of hearing for sound of that particular frequency. This procedure is repeated for a plurality of different frequencies within the audible range, thereby to provide an overall knowledge of the hearing of the individual in question. Since sound of only a single frequency is used, standing waves are set up within the room where the procedure is being carried out, and as a result the precise location of the ear of the individual under test becomes quite critical. Movement of the individual's head for only a few inches from one position to another may give rise to a significant difference in test results, since the ear may move from a high amplitude portion of the standing wave to a low amplitude portion thereof.

Standing wave problems arise not only in a room, but in any confined space of appreciable volume within which the ear of the wearer is located. For example, such problems arise when a dome is placed over the head of a person, or when earphones having large cavity earpieces are employed.

One proposal to avoid the standing wave effect which has been made in the past is to cause the testing sound to warble on what is essentially a single frequency. The circuitry required to produce this variable frequency is relatively complicated and adds appreciably to the expense of the equipment. Moreover, the standing wave problem is not eliminated but merely somewhat minimized; what happens is that the effect is roughly averaged out in an essentially inexact manner.

Because of the criticality arising from the standing wave situation, and the virtual impossibility of having the individual under test remain in precisely the same position for any appreciable period of time, the tests are usually conducted with earpieces, so that the testing sound is transmitted directly to the ears of the individual without passing through the room at all. This too, adds to the cost of the testing equipment and constitutes a source of emotional as well as physical discomfort to the individual. The emotional aspect of this last factor is quite important. Persons needing hearing aids are ordinarily quite sensitive about what they consider to be a physical defect, and it is often difficult to get them to have their hearing tested at all. The earphone procedure has another very significant drawback—it is quite difficult to use effectively when the individual is wearing a hearing aid, and hence this prior art procedure is not particularly effective in demonstrating to a prospective user of a hearing aid the true nature of the improvement in his hearing which that hearing aid will provide.

These prior art testing procedures have involved relatively complex, and therefore expensive, equipment (involving frequency adjustment as well as amplitude adjustment), together with earpieces and associated electrical components, and the actual operations involved are much more suited to laboratory or scientific analysis than they are to practical demonstrations of the value of a hearing aid to a person suffering from loss of hearing. Such equipment is essentially unsuited for use by lay personnel such as vendors of hearing aids, and is equally unsuited for use with the vast proportion of persons suffering from impaired hearing, who require only an overall analysis of hearing acuity and for whom a dramatic demonstration of the benefit of a hearing aid is necessary before they will purchase one. There is a place, however, for equipment of a laboratory nature.

It is the prime object ofthe present invention to eliminate the disadvantages inherent in the prior art practices as described above, and in particular to provide a method for the testing of hearing, and a simple and inexpensive apparatus useable in that method, which, in a short period of time and without discommoding the individual in question, will determine his overall acuity of hearing (and hence whether he needs a hearing aid or not, and the magnitude of hearing assistance which he requires) and to vividly demonstrate to that individual, virtually instantaneously, the improvement in hearing provided by any paricular hearing aid. The method and apparatus of the present invention is useable alike by physicians and by lay personnel. The apparatus is simple, essentially completely self-contained, inexpensive, and highly portable, and may be used to carry out the method virtually anyplace where the individual to be tested may be (home, doctor's office, store, or even in an open field), and under virtually any ambient conditions.

Hearing is a very complex thing, and is affected by many factors. A person's ability to hear a pure tone in a quiet room may be quite different from his ability to hear that tone over a noise background. His ability to hear a pure tone may also be quite different from his ability to hear a complex sound such as speech, and his ability to hear speech may be quite different in a quiet room and when there is a noise background. It is a further prime object of the present invention to provide a method for the testing of hearing, and a relatively simple and inexpensive apparatus useable in that method, for testing hearing of speech or of sound of different nominal frequencies, both in the absence and in the presence of background noise of different amplitudes or intensities.

In accordance with one aspect of the present invention a composite sound is produced which contains a number of different frequencies extending over an appreciable frequency range from perhaps ±2½% of a nominal frequency within the audible range, such as 1000 c.p.s., to a range extending substantially throughout the normal audible frequency range ("white noise," so called by the analogy to the color white which contains substanially all of the color frequencies within the visible range). The frequencies of sound present in this composite sound are randomly distributed over the range in question, and preferably occur in random fashion and in random phase relationship with one another.

Because of the multiplicity of frequencies present in the sound as produced, no standing wave pattern will be created when the sound is produced in a closed area such as a room, and hence the location of the individual's ears within that room is not a critical matter. Of course, the intensity of the produced sound which reaches the individual's ear will be a function of his distance from the source of that sound, but small changes in this distance will have only a very minor effect on the amplitude of the sound heard. Because there is no standing wave problem, there is no necessity, or even desirability, for using earpieces. This not only makes the test much more comfortable to the individual, both emotionally and physically but also makes the test equally effective whether the individual is listening through unaided ears or through a hearing aid which he carries on his person. As a result, the test is equally effective, and equally as easily carried out, for unaided hearing as for aided hearing. This represents a prime point of differentiation over the prior art.

In carrying out the test, all that need be done is to vary the amplitude of the composite sound in order to determine either the lower threshold or the pain threshold, or both, of the particular individual under test. By comparing the sound intensity required for the individual to hear with ears alone and the sound intensity at which he can hear when fitted with a hearing aid, or by producing a composite sound of given intensity and letting the individual compare the ease with which he can hear that sound with and without a hearing aid, the value and effect of the hearing aid to that individual can be readily and dramatically demonstrated. This is a matter of considerable importance to vendors of hearing aid devices. It is also, and perhaps more importantly, a matter of reassurance to prospective purchasers of hearing aids, who want to be sure that they are getting their money's worth, and that their hearing will truly be helped by the appliance which is offered to them for purchase.

The apparatus for carrying out this method, which in its simplest form may all be contained within a casing six inches tall, less than three inches wide and one and one-half inches deep, comprises electronic means for producing oscillations having the requisite frequencies and adjustably amplifying those vibrations, the controlled output of this vibration-producing means being fed to a transducer such as a small loudspeaker so as to produce sound of the desired frequency characteristics and amplitude. The device is provided with two controls, one for turning the sound on and off and the other for controlling the volume or amplitude of the sound. Present technology makes it possible to provide, within a casing of the size described, all of the operative components for the apparatus, including a power source such as a battery. The apparatus may therefore be carried in the pocket and may be used wherever and whenever desired.

The simplified method and apparatus just described is exceptionally well adapted for use by concerns which sell hearing aids. For more sophisticated analysis, by physicians or those engaged in research, a more complex method and apparatus is here disclosed, which, in addition to the composite sound described above, and specifically one which is of the relatively narrow band type having frequencies within approximately ±2½% of a nominal frequency, produces a broader band composite sound which can be mixed with the narrow band composite sound in predetermined volume proportions, and which also provides for the production of a complex sound in the nature of speech which can be mixed with either of the previously specified sounds in adjustable volume proportion. Controls are provided which permit the user to select the particular sounds desired and to control their volume. Thus "nominal tone" testing can be carried out either alone or with a noise or speech background of desired volume, and "speech" testing can be carried out with or without a background noise of adjustable volume, all without any standing wave patterns. Moreover, means are provided to permit the selection of background broader band noise in a wide variety of pitches or ranges, thus permitting a very wide flexibility in the nature of the testing which can be carried out.

In this latter more sophisticated type of apparatus "white noise" extending over substantially the entire audible frequency range is produced. Those frequencies defining the desired narrow band of composite sound are selected therefrom for "nominal tone" testing without standing wave problems. Wider bands of noise are selected from the output of the "white noise" generator in order to produce the background noise against which the "nominal tone" or speech testing is to be carried out. The speech sound is produced in any desired fashion, as by the use of a microphone into which the person carrying out the test will talk.

By means of the apparatus of the present invention, specially designed to be used in carrying out the novel method of the present invention, tests of hearing acuity may be made with very much greater ease and rapidity than has previously been thought possible, and an overall indication of the hearing ability of the individual in question will be almost instantaneously presented, whether that hearing ability relates to unaided hearing or hearing assisted by a hearing aid. Moreover, it is possible with the use of the more sophisticated versions of the present invention to carry out complex testing procedures in a simple, accurate and reliable fashion.

To the accomplishment of the above, and to such other objects as may hereinafter appear, the present invention relates to method and apparatus for the testing of hearing as defined in the appended claims, and as described in this specification, taken together with the accompanying drawings, in which:

FIG. 4 is a schematic representation of a typical environment in which a more sophisticated embodiment of the method of the present invention can be carried out, the testing apparatus being shown in position;

FIG. 5 is a three-quarter perspective front view of the testing apparatus housing;

FIG. 6 is a block diagram of the testing system embodied in FIGS. 4 and 5;

FIG. 7 is a schematic representation of a typical environment in which yet another embodiment of the method of the present invention can be carried out, the testing apparatus being shown in position on a table;

FIG. 8 is a three-quarter perspective front view of the testing apparatus housing shown in FIG. 7;

FIG. 9 is a three-quarter perspective rear view of the testing apparatus housing shown in FIG. 7; and FIG. 10 is a block diagram of the circuitry employed in conjunction with the disclosure of FIGS. 7–9.

Figure 1:
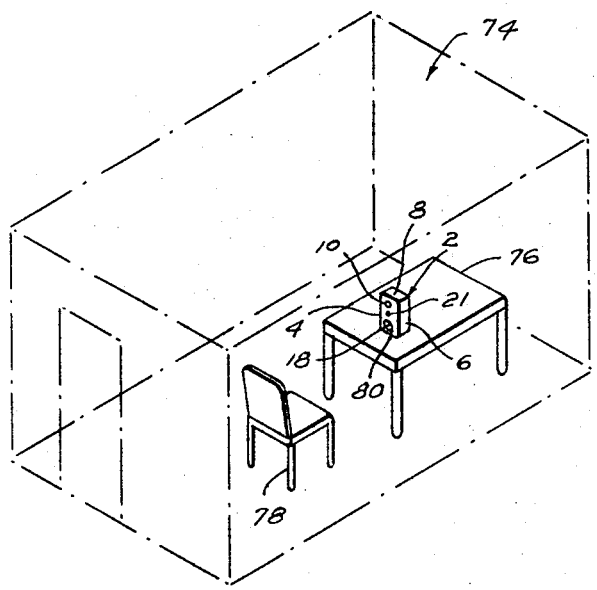
FIG. 1 is a schematic representation of a typical environment in which the method of the present invention can be carried out, the testing apparatus being shown in position on a table.
Figure 2:
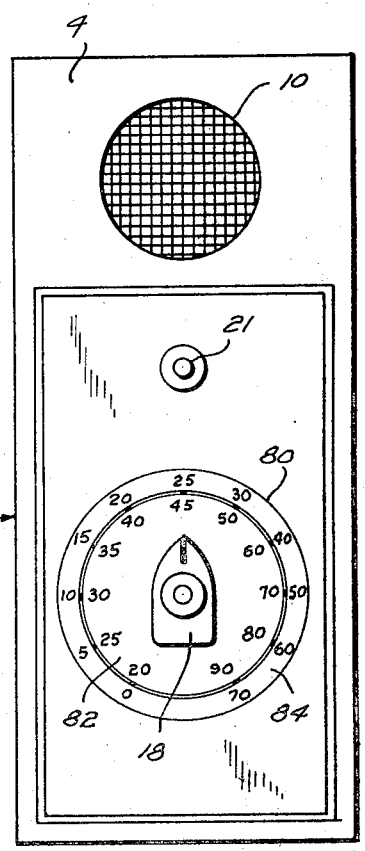
FIG. 2 is a front elevational view of a typical embodiment of the testing apparatus.
Figure 3:
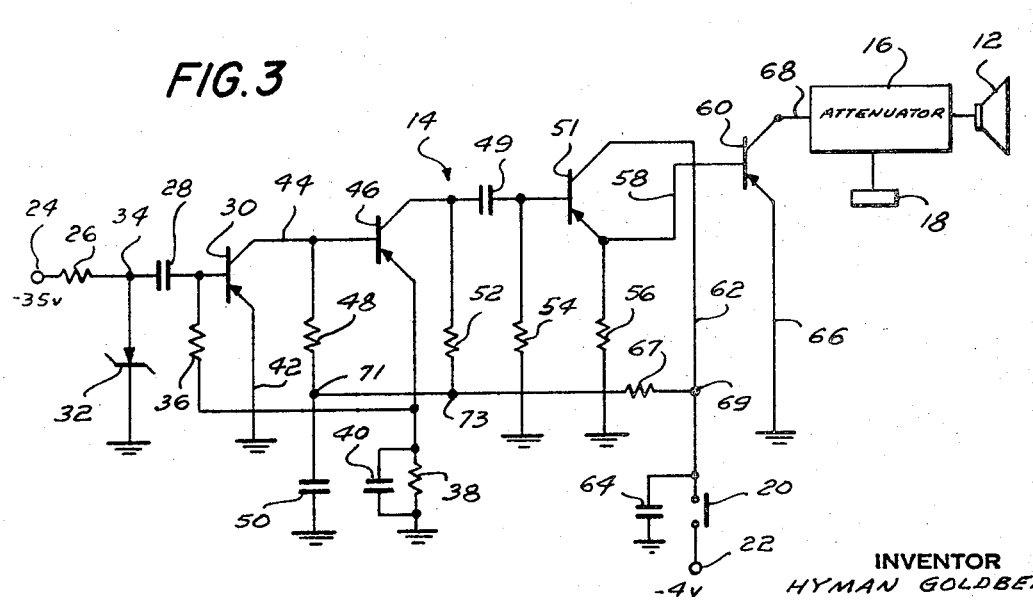
FIG. 3 is a circuit diagram illustrating one type of circuit which can be employed to produce the composite sound containing frequencies extending substantially throughout the normal audible frequency range.

Turning first to the embodiment of FIGS. 1–3, the testing apparatus there disclosed comprises a housing generally designated 2 having a front wall 4, side walls 6, a top wall 8, and rear and bottom walls which are not shown in the drawings. The front wall 4 is provided with a sound-permeable opening 10 behind which a transducer such as a loudspeaker 12 is mounted. The transducer 12 is adapted to be energized by a sound producing means generally designated 14, one specific embodiment of which is illustrated in FIG. 3. Connected between the sound producing means 14 and the loudspeaker 12 is a variable attenuator 16 provided with a control knob 18 which is mounted on and is accessible at the exterior of the housing wall 4. While the element 16 is denominated an "attenuator," it will be appreciated that it could also take the form of a variable amplifier. The nature of the sound producing assembly comprising the parts 12, 14, 16 is such that it will produce a sound containing frequencies extending substantially throughout the normal audible frequency range, which sound can have its amplitude or intensity controlled by means of the attenuator 16 without appreciably affecting its frequency composition, the sounds at the various frequencies all preferably being at substantially the same amplitude. The particular commercial embodiment here disclosed produces a sound having a flat response between 250–7000 cycles per second plus or minus only 4 db. The sound output from the loudspeaker 12 passes through the opening 10 in the housing wall 4, and thus may be heard. An on-off switch 20 is also provided on the exterior of the housing wall 4, that switch here being disclosed as controlled by a spring-biased button 21 which, when pressed against the action of the spring, acts to close the switch 20 and energize the vibration-producing circuitry 14.

The so-called "white noise" may be produced in a large variety of ways. The circuit shown in FIG. 3 has been devised to produce such "white noise," extending over substantially the entire frequency range, in appropriate and appreciable intensities with a truly minimal power consumption, thus enabling the housing 2 to contain within itself battery power for the equipment which will have an exceptionally long life, permitting the device to be used for approximately one year of average useage without having to replace the battery.

The battery provides a 4-volt voltage at point 22 and, through an appropriate power supply, a 35-volt voltage at point 24. Resistor 26 and capacitor 28 connect point 24 to the base of transistor 30, a Zener diode 32 being connected between ground and point 34 located between resistor 26 and capacitor 28. The base of transistor 30 is connected to ground via a resistor 36 and resistor 38, capacitor 40 being connected in parallel with resistor 38. The emitter of transistor 30 is connected directly to ground by lead 42, and the collector thereof is connected by lead 44 to the base of transistor 46, that base being connected to ground by a resistor 48 and capacitor 50. The emitter of transistor 46 is connected to ground by resistor-capacitor network 38, 40, and is connected by capacitor 49 to the base of transistor 51. The collector of transistor 46 is connected to ground via resistor 52 and capacitor 50. The base of transistor 51 is connected to ground by resistor 54. The emitter of transistor 51 is connected to ground by resistor 56, and is also connected by lead 58 to the base of transistor 60. The collector of transistor 51 is connected to ground by lead 62 and capacitor 64, lead 62 also connecting the collector of transistor 51 to the on-off switch 20 interposed in advance of voltage point 22, that switch 20 being normally off and movable to "on" condition by actuation of the button 21. A resistor 67 is connected between point 69 on lead 62 and points 71 and 73, point 71 being located between resistor 48 and capacitor 50 and point 73 being located at the lower end of resistor 52. The emitter of transistor 60 is connected directly to ground by lead 66, and its collector is connected by lead 68 to the adjustable attenuator 16. The Zener diode 30 is biased at the knee of its curve in order to produce the greatest amount of multiple frequency noise signal of the type desired. Transistors 30 and 46 amplify that noise, and the output from transistor 46 is fed to the network including transistors 51 and 60. These latter transistors are not biased, and thus produce a large spike-type output from transistor 60, which drives the loudspeaker 12 at a variety of frequencies spreading over the audible range and including virtually all of the frequencies within that range. The acoustic characteristics of the loudspeaker 12 and of the acoustical chamber within which that loudspeaker 12 is contained, together with the characteristics of the electrical input to the loudspeaker 12, give rise to a sound output having the desired frequency characteristic which passes through the opening 10 and emanates from the housing 2 when the button 21 is pressed so as to close switch 20 and connect the point 22 into the circuit.

Purely by way of example, and not by way of limitation, circuit components having the following values may be used in the circuit of FIG. 3.

| | | |
|---|---|---|
| Resistor 26 | ohms | 470K |
| Capacitor 28 | mf | .05 |
| Transistor 30 | | Type 2N508 |
| Zener diode 32 | | Type CD34229 |
| Resistor 36 | ohms | 27K |
| Resistor 38 | do | 330 |
| Capacitor 40 | mf | 20 |
| Transistor 46 | | Type 2N508 |
| Resistor 48 | ohms | 4.7K |
| Capacitor 49 | mf | 4 |
| Capacitor 50 | mf | 100 |
| Transistor 51 | | Type 2N508 |
| Resistor 52 | ohms | 2.2K |
| Resistor 54 | do | 10K |
| Resistor 56 | do | 150 |
| Transistor 60 | | Type 2N1184A |
| Capacitor 64 | mf | 100 |
| Resistor 67 | ohms | 560 |

The described apparatus is useable in a very convenient fashion to test the hearing of an individual. FIG. 1 represents in idealized form a typical environment in which the test can be carried out, that environment comprising a room or other enclosure generally designated 74, the housing 2 with its enclosed operative components being placed on a table 76 within that room 74. A chair 78 is provided on which the individual to be tested may be seated. To use the apparatus the operator presses the button 20, thus causing the desired type of sound to be produced. The operator manipulates the knob 18 so as to vary the sound amplitude level, and in a typical procedure the operator in this fashion may vary the amplitude until it is just loud enough to be heard by the individual. This amplitude he can then determine from the calibrated dial 80 with which the control knob 18 cooperates, that dial as here illustrated having one series of graduations 82 representing sound pressure level in accordance with conventional definition, and the other set of graduations 84 being calibrated in decibels, with the zero value corresponding to the normal minimal hearing level of a twenty-one-year adult in a quiet room (this corresponding to a sound pressure level of 20). Thus the reading on the dial 80 will, because the sound in question is composed of frequencies extending substantially throughout the normal audible frequency range, give an immediate numerical indication of the degree to which the overall hearing acuity of the individual under test differs from that which would normally be expected or which might be considered as ideal. The effective hearing loss indicated on the dial 80 is approximately equal to the reading given by a pure tone audiometer for a flat frequency loss. The entire procedure takes but a few seconds, far less time than it takes to read this paragraph.

In similar fashion the amplitude of the produced sound could be increased to the level of pain, and thus the pain threshold or upper limit hearing threshold of the individual can as readily be determined.

The individual, if his hearing is shown to be defective, can then be supplied with a hearing aid and the test repeated, after which the reading on the dial 80 for minimum audibility with the hearing aid can be compared with the reading taken when no hearing aid was being used, thus demonstrating dramatically the degree of overall hearing improvement which the hearing aid has produced.

The embodiment of FIGS. 4–6 constitutes a more sophisticated apparatus which permits many different types of testing to be performed, also without interference from standing waves. FIG. 4 discloses one way in which the method can be carried out and apparatus used. The person to be tested is located in a room or other enclosure 74', while the person performing the test is located outside of that room 74'. Within the room is a chair 78' on which the individual to be tested may be seated, and also within the room is a loudspeaker 88 which is electrically connected in any appropriate manner to the output derived from the testing and control apparatus per se, generally designated 90 and housed on and within a housing 2' which may be located outside the room 74'. In the illustrated two-room embodiment, in order to permit the individual being tested to communicate with the tester, a microphone 92 is provided within the room which is operatively connected to a loudspeaker 94 carried by the housing 2' and oriented toward the tester, who may be seated on the chair 96 in front of a table 98 on which the housing 2' is placed.

The electrical structure and modes of operation of the system disclosed in FIG. 4 can best be seen from FIGS. 5 and 6. Within the housing 2' is a "white noise" generator 100 which may be the same as that shown in FIG. 3. Its output is connected to a narrow band filter circuit 102 which is adjustable under control of the selector knob 104 on the housing 2' to select from the "white noise" sound having frequencies over a comparatively restricted band width, which could be as small as a nominal frequency ±2½. Typically, acutation of the control knob 104 permits selection of narrow band "nominal tone" sound having nominal frequencies of 125, 250, 500, 750, 1000, 1500, 2000, 3000, 4000, 6000, and 8000 c.p.s. It has been found that with "nominal tone" sound having a bandwidth of the magnitude specified (±2½% of a nominal frequency) the standing wave problem is substantially eliminated. The greater the bandwidth of the sound the more reliably is the standing wave problem eliminated.

The selected narrow band "nominal tone" output from the filter circuti 102 is fed through a switch 105 to a matching and mixing network 106 the output of which is supplied to a calibrated attenuator 108 adjusted by the control knob 110. The output of the attenuator 108 is fed to power amplifier 112, the output of which, in turn, energizes the loudspeaker 88.

The system of FIGS. 4–6, as thus far described, can therefore be used in substantially the same fashion as the previously described embodiment of FIGS. 1–3.

The "white noise" from source 100 is also fed to a filter assembly 114, which comprises a plurality of comparatively wide band filter circuits individually or collectively selectable by means of the switch assembly generally designated 116, and defined in this embodiment by seven individual switches 118. The individual filter circuits of the assembly 114 are designed to pass "whitenoise" over a range of frequencies comprising a nominal frequency aproximately ±30%. Typical such ranges could comprise succesive octaves of 125–250, 250–500, 500–1000, 1000–2000, 2000–4000 and 4000–8000 c.p.s. respectively. Actuation of the switch 118a will permit the passage through the filter assembly 114 of "white noise" over a much wider spectrum, such as 250–4000. c.p.s. The selected output from the switch assembly 116 is fed to switch 120, which has two positions, connecting the operative output of the filter assembly 114 either to the matching and mixing network 106 or to a matching and mixing network 122. The network 122 has another input from switch 124, to which is connected the output of an amplifier 126 actuated by a microphone 128 mounted on the housing 2'. The output from the matching and mixing network 122 is fed to an attenuator 130 variable by means of the control knob 132, and the output from attenuator 130 is fed to the power amplifier 112. The microphone 92 located within the room 74' is connected by amplifier 132 to the loudspeaker 94, the amplifier 132 having a volume control 134 actuated by the control knob 136. An on-off switch 137 and an on-off indicator light 139 are provided.

The level of the sound produced when one speaks into the microphone 128 is visually indicated on the control panel of the housing 2' by means of the meter 138, the zero position of which is adjustable by knob 141.

When one wishes to test how well an individual can hear over a background noise level switch 105 is closed, switch 124 is opened, and switch 120 is actuated to connect the output of the filter assembly 114 to the matching and mixing circuit 122. The filter assembly 102 is actuated to select the desired nominal sound frequency for testing, and the appropriate switch 118 is actuated to select the desired type of background noise. The relative volumes of the "nominal tone" sound and the background noise are adjusted by means of the attenuators 108 and 130 respectively. If acuity of hearing of speech sounds over a background noise is to be tested, switch 124 is closed, switch 105 is opened, switch 120 is actuated to connect the output of the filter asembly 114 to the matching and mixing circuit 106, and the appropriate switch 118 is actuated to produce the desired type of background nose. The relative volumes of the speech and background noise are controlled respectively by the attenuators 130 and 108.

Although in this embodiment the two sounds which are to be present simultaneously are mixed within the circuitry of the unit and emanate from a single loudspeaker 88, it will be apparent that, if desired, separate circuit assemblies, each with its own individual loudspeaker, could be provided, the sound mixing occurring acoustically within the room or other confined space 74'.

The embodiment of FIGS. 7–10 represents an alternative arrangement providing for a degree of flexibility in operation intermediate between the two embodiments previously disclosed. As shown in FIG. 7, within a room 74" is located a table 76' on which the housing 2" of the testing apparatus is mounted, the person whose hearing is to be tested being seated in chair 78" on one side of the table 76', the tester sitting in chair 96' on the other side of the table 76'. Carried by the housing 2" are a "white noise" generator 100 effective over substantially the entire audible frequency range, narrow band filter 102 actuated by control knob 104, switch 105, matching and mixing circuit 106, attenuator 108 actuated by control knob 110, power amplifier 112, broad band filter assembly 114, switch assembly 116 defined by the switch buttons 118 and 118a, on-off switch 137 and on-off indicator light 139, all as in the embodiment of FIGS. 4–6. The output from the filter assembly 114 is, however, connected directly to the matching and mixing circuit 106. Thus, through selective actuation of the switch 105 or any one of the individual switches 118, 118a, the output of the power amplifier 112 will consist either of "nominal tone" sound suitable for testing hearing acuity at a given nominal frequency or broad band "white noise" suitable for use as a background noise, all without standing wave problems. This power amplifier output is fed to a loudspeaker 88' which may be located within the housing 2" and which faces toward the rear face of that housing, as illustrated in FIG. 9, thereby to be directed toward the person being tested.

The system of this embodiment is further provided with a speech system operative from the tester to the person being tested. To that end a microphone 128' is mounted in the housing 2" and is directed toward the tester. This microphone is connected to an amplifier 126' which feeds an attenuator 130' actuated by a control knob 132', the intensity of the sound output from the attenuator 130' being monitored by an indicating instrument 140 located on the control panel of the housing 2" and facing the tester. The output from the attenuator 130' may be fed to the microphone 88' through the mixing and matching circuit 112, or, if desired, it may be fed to its own loudspeaker 88a, which may be mounted within the housing 2" or within its own separate housing, as desired. Thus with the apparatus of the embodiment of FIGS. 7–10 the testing of hearing can be carried out for a "nominal tone" sound or for speech sounds the intensity of which is controllable and ascertainable, or for speech sounds with background noise, the relative magnitudes of those two types of sound being individually adjustable, in all cases without standing wave problems.

The controlled and controllable use of both narrow band and wide band noise for background noise purposes or for direct hearing acuity measurements, and the use of such noise in conjunction with speech sounds or "nominal tone" sounds, thereby to determine the functioning of the hearing of an individual under a wide variety of different circumstances, is readily accomplished in accordance with the present invention, and by means of apparatus which is simple in construction and easy to operate.

The apparatus and method of the present invention will therefore be seen to be unexcelled in demonstrating the need for and the value of a hearing aid for a particular individual, and for potently and immediately evaluating and comparing the effects of different hearing aids for that individual. The tolerance range—the range between minimal audibility and pain threshold—can also be determined rapidly and effectively.

A particular feature is the fact that the tests can be carried out under normal circumstances, with ambient noise present, the tests therefore representing practical results rather than laboratory or "pure science" results, it being borne in mind that the purpose of a hearing aid is to permit the user to hear better under normal circumstances, when ambient noise is present.

The apparatus of the present invention is also useable for allied purposes, such as determining the ambient noise level in a particular place, such as a factory or crowded restaurant. "White noise" is produced and its amplitude is adjusted until it is just discernible over the ambient noise. Because of the frequency content of the noise produced by the device, and the fact that ambient noise itself contains a large variety of audible frequencies, the reading on the dial 80 will give a reasonably accurate indication of the ambient noise level. Other analogous uses will readily suggest themselves.

Thus the device and method of the present invention, in its various embodiments here disclosed, provide for much more rapid and convenient testing of the overall hearing characteristics of an individual than has heretofore been possible, and for the testing of that hearing under controlled laboratory conditions under a wide variety of different circumstances. The simplified method and apparatus of FIGS. 1–3 are of particular significance in connection with the commercial demonstration to a prospective customer of the value of a hearing aid and the relative merits, to his particular condition, of different styles of hearing aids. The method and apparatus of the other illustrated embodiments can also be used for those purposes, but because of their increased sophistication they are also adaptable to medical testing and laboratory research. The apparatus involved in each case is, taking into consideration the functions which it will perform, exceedingly simple, inexpensive and portable, and is relatively foolproof in operation.

While but a limited number of embodiments of the present invention have been here specifically disclosed, and only a limited number of ways by which the method of the present invention can be carried out have been specifically set forth, it will be apparent that many variations may be made both in apparatus and in specific method details, all within the spirit of the invention as defined in the following claims.

I claim:
1. The method of testing the hearing of an individual which comprises producing, at a point spaced from said individual and within a confined space having a volume such as to permit the formation of standing sound waves therein, a composite sound containing sounds of random frequencies comprising a nominal frequency and frequencies extending over a range of at least approximately $+2\frac{1}{2}\%$ of said nominal frequency, and causing said composite sound to travel freely to said individual through said confined space, varying the amplitude of said composite sound, and correlating said amplitude with the ability of said individual to hear said composite sound at different levels of amplitude thereof, thereby to determine the overall keenness of hearing of said individual.

2. In the method of claim 1, mixing with said composite sound a second sound comprising speech.

3. The method of claim 1, in which said composite sound comprises a narrow band of sound comprising a nominal frequency and frequencies extending over a range of approximately $\pm 2\frac{1}{2}\%$ of said norminal frequency, and mixing with said composite sound a second composite sound comprising sounds of random frequency defining a broad band of sound comprising a nominal frequency and frequencies extending over a range of at least approximately $\pm 30\%$ of said nominal frequency.

4. In the method of claim 3, the steps of selecting, from said broad band of sound, a second operative sound comprising a second nomminal frequency different from the nominal frequency of said first mentioned operative sound and frequencies extending over a range of at least approximately $\pm 30\%$ of said second nominal frequency, and combining said second operative sound with said first operative sound.

5. A device for testing the hearing of an individual comprising a support, means on said support for producing a composite sound comprising a nominal frequency and frequencies extending over a range of approximately $\pm 2\frac{1}{2}\%$ of said nominal frequency, manually accessible control means on said support operatively connected to said first mentioned means and effective, when manually adjusted, to vary the amplitude of said composite sound, means for producing a second composite sound, and means for mixing said second composite sound with said first composite sound in adjustable volume proportion.

6. The device of claim 5, in which said second composite sound comprises speech.

7. The device of claim 5, in which said second composite sound comprises sounds of random frequency defining a broad band of sound comprising a nominal frequency and frequencies extending over a range of at least approximately ±30% of said nominal frequencies.

8. The device of claim 5, in which a single composite sound producing means is provided for producing a broad band of sound comprising frequencies extending substantially throughout the nominal audible frequency range, said means for producing sound comprising a nominal frequency and frequencies extending over a range of approximately ±2½% of said nominal frequency comprising means for selecting from said broad band of sound a narrower band of operative sound comprising said nominal frequency and said frequencies extending over said range, said second composite sound being defined by the output of said single composite sound producing means after said narrower band of operative sound has been selected therefrom.

References Cited

UNITED STATES PATENTS

| | | | |
|---|---|---|---|
| 3,007,002 | 10/1961 | Du Vall | 179—1.7 |
| 2,986,140 | 5/1961 | Gardner et al. | 179—1 |
| 2,768,236 | 10/1956 | Allison | 179—1.7 |
| 2,394,569 | 2/1946 | Strommen | 179—1.7 |
| 2,287,401 | 6/1942 | Wengel | 179—1.7 |

OTHER REFERENCES

Article, "White Noise," by Lon Edwards, Electronics World, November 1962, pp. 40–42.

KATHLEEN H. CLAFFY, *Primary Examiner.*

R. P. TAYLOR, *Assistant Examiner.*